No. 792,490. PATENTED JUNE 13, 1905.
E. R. BARBER.
GIN FEEDER.
APPLICATION FILED APR. 29, 1903.
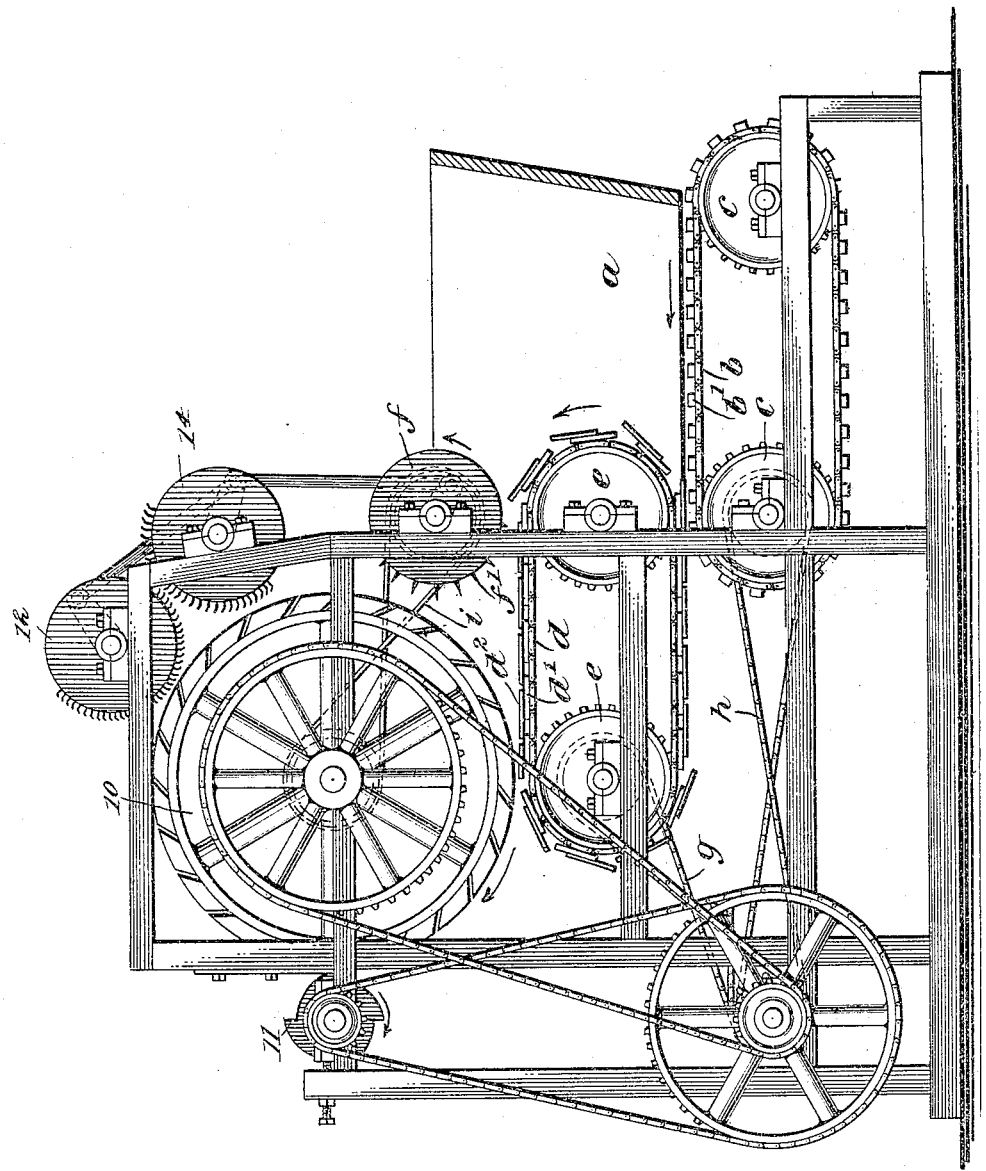
WITNESSES:
Joshua Bingham
Isaac B. Owens.
INVENTOR
Eugene R. Barber
BY
Munn
ATTORNEYS.

No. 792,490.

Patented June 13, 1905.

UNITED STATES PATENT OFFICE.

EUGENE R. BARBER, OF VALDOSTA, GEORGIA.

GIN-FEEDER.

SPECIFICATION forming part of Letters Patent No. 792,490, dated June 13, 1905.

Application filed April 29, 1903. Serial No. 154,816.

*To all whom it may concern:*

Be it known that I, EUGENE R. BARBER, a citizen of the United States, and a resident of Valdosta, in the county of Lowndes and State of Georgia, have invented a new and Improved Gin-Feeder, of which the following is a full, clear, and exact description.

This invention relates to a means for feeding seed-cotton to ginning-machines. It is adapted for use in connection with any gin— for example, that shown in my prior patent, No. 619,116, dated February 7, 1899, but particularly that disclosed in my prior patent, No. 766,582, dated August 2, 1904, and also in connection with the gin disclosed in my prior patent, No. 750,567, dated January 26, 1904, the application on which the last-named patent issued originally embodying the gin-feeder forming the subject-matter of the present case.

The apparatus as here illustrated involves a hopper the bottom of which is formed of a traveling carrier which moves the cotton continuously at one end. At said end is a peculiarly-constructed gripping and conveying device which takes the cotton from the hopper and carries it to the gin, the superfluous cotton being removed from the gripping and conveying device by a rocker which works above the same.

This specification is an exact description of one example of my invention, while the claims define the actual scope thereof.

Reference is had to the accompanying drawing, forming a part of this specification, which drawing represents a side view of my gin-feeder in operative adjustment with respect to the gin, such as that which forms the subject-matter of my prior patent, No. 766,582, dated August 2, 1904, and referred to above.

$a$ represents the hopper, which may be of any construction desired and mounted by any convenient means. Said hopper has its bottom and one end open. At said open bottom of the hopper is arranged a conveyer which forms virtually the bottom of the hopper and in addition serves to give the seed-cotton a continuous motion toward the open end of the hopper. This conveyer is preferably in the form of two endless chains $b$, located one at each side of the hopper and carried on suitable sprocket-wheels $c$. Extending between said chains are lags or slats $b'$, which connect the chains and form the body of the conveyer. These slats being spaced from each other form a roughened or irregular surface which effectually engages the cotton.

At the open end of the hopper is arranged the gripping and conveying device which carries the seed-cotton to the gin proper. This gripping and conveying device comprises an endless cotton-gripping conveyer formed of two side chains $d$, running over suitable sprocket-wheels $e$ and connected by transverse lags or slats $d'$, forming the body of the conveyer. Said slats have fastened thereto gripper-teeth $d^2$ longitudinally of the conveyer. These teeth extend beyond the slats to which they are fastened, and when the conveyer is running in a straight line overlap the slat next adjacent. When, however, the conveyer is passing in a curved line around the sprocket-wheels $e$, the slats $d'$ open from the chain, and this throws open the gripping-teeth $d^2$, as indicated in the drawing. The gripper moving in the direction indicated by the arrow and the gripping-teeth being disposed at the leading edges of the slats $d'$ engage the cotton and draw it into the spaces between the gripping-teeth and the slats. Then as the chain reaches the top of the sprocket-wheels and returns to its straight-line movement the grippers close down on the slats and the cotton is securely held in the plates and carried forward into the gin.

In order to remove from the conveyer and gripper all superfluous cotton, I provide a raker in the form of a rotary drum $f$, mounted in the open end of the hopper $a$ immediately above the conveyer and gripper and having a number of radial teeth or spurs $f'$, which are arranged to project from the drum at the lower side thereof—*i. e.*, the side adjacent to the gripper and conveyer—but which teeth are withdrawn into the drum at the upper side. This drum may be of any construction desired by which the above functions are attained. For example, it may be of the structure disclosed in the patent to Coons, *et al.*, No. 186,804, dated April 17, 1876. The drum $f$ is given a rotary movement in the direction of the arrow marked on the drawing, and in so doing the teeth $f'$ are swept over the gripper and conveyer immediately upon the closing of the gripper-plates. This removes the superfluous cotton, and by the proper adjustment of the parts the amount of cotton fed to the gin may be exactly regulated.

The direction of movement of the various elements is indicated by the arrows on the drawing. Any desired mechanism may be employed for imparting these movements. In the present construction the conveyer and gripper are driven by a chain $g$ from a part of the gin, and the hopper-bottom is driven by a chain $h$, also from a mobile part of the gin, while the raker is driven by a belt $i$, passing from the drum of the gin. This, however, is not essential to my invention. As before stated, this gin-feeder may be used with a gin of any type desired. The gin illustrated in the drawing comprises a main drum 10, with cotton-engaging teeth thereon, a rotary stripper 11, and rollers 12 and 14. The rotary stripper 11 removes the seed from the cotton and the rollers 12 and 14 remove the cotton from the drum.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. A conveying and gripping device, for the purpose specified, comprising an endless chain, transverse lags attached thereto, gripping-fingers fastened to the lags and extending transversely thereof, the fingers of one lag projecting forwardly beyond the same to overlap the lag adjacent, for the purpose specified, and wheels on which the chain is mounted.

2. A gin-feeder, comprising a hopper having an open bottom and end, a conveying device extending along said bottom and feeding toward the open end of the hopper, a wheel located in said open end of the hopper, and a conveying device extending over the wheel and adapted to carry the cotton from the hopper to the gin, said conveying device comprising transverse lags, and gripping-fingers fastened to the lags and extending transversely thereof, the fingers of one lag projecting beyond the side thereof, whereby as said conveyer passes around the wheel the gripping-fingers open to receive the cotton and close as the conveyer passes from the wheel.

In testimony whereof I have signed my name to this specification in the presence of two subscribing witnesses.

EUGENE R. BARBER.

Witnesses:
J. F. PASSMON,
R. T. MYDDELTON.